(12) United States Patent
Allen et al.

(10) Patent No.: US 8,845,851 B2
(45) Date of Patent: Sep. 30, 2014

(54) PROTEIN ADHESIVE FORMULATIONS WITH AMINE-EPICHLOROHYDRIN AND ISOCYANATE ADDITIVES

(75) Inventors: Anthony J. Allen, Madison, WI (US); James M. Wescott, Waunakee, WI (US); Daniel F. Varnell, Wilmington, DE (US); Michael A. Evans, Wilmington, DE (US)

(73) Assignee: Solenis Technologies, L.P., Wilmington, DE (US)

( * ) Notice: Subject to any disclaimer, the term of this patent is extended or adjusted under 35 U.S.C. 154(b) by 331 days.

(21) Appl. No.: 13/116,359

(22) Filed: May 26, 2011

(65) Prior Publication Data
US 2011/0293934 A1 Dec. 1, 2011

Related U.S. Application Data

(60) Provisional application No. 61/348,432, filed on May 26, 2010.

(51) Int. Cl.

| | | |
|---|---|---|
| *C09J 4/00* | (2006.01) | |
| *C09J 101/00* | (2006.01) | |
| *C09J 201/00* | (2006.01) | |
| *C08L 89/00* | (2006.01) | |
| *C08L 97/02* | (2006.01) | |
| *C09J 179/02* | (2006.01) | |
| *C09J 189/00* | (2006.01) | |
| *C08L 97/00* | (2006.01) | |
| *C08L 63/00* | (2006.01) | |

(52) U.S. Cl.
CPC .............. *C09J 189/00* (2013.01); *C08L 97/005* (2013.01); *C08L 97/02* (2013.01); *C08L 63/00* (2013.01); *C08L 89/00* (2013.01); *C09J 179/02* (2013.01)
USPC .......................................... 156/331.4; 524/25

(58) Field of Classification Search
CPC .... C08G 18/10; C08G 18/12; C08G 2170/80; C08L 89/00; C08L 2666/14; C08L 97/02; C09J 189/00; C09J 179/02
USPC .......................................... 156/331.4; 524/25
See application file for complete search history.

(56) References Cited

U.S. PATENT DOCUMENTS

| | | |
|---|---|---|
| 1,724,695 A | 8/1929 | Davidson |
| 1,813,387 A | 7/1931 | Davidson et al. |
| 1,994,050 A | 3/1935 | Satow |
| 3,494,750 A | 2/1970 | Phipps |
| 7,060,798 B2 | 6/2006 | Li et al. |
| 7,252,735 B2 | 8/2007 | Li |
| 2008/0021187 A1 | 1/2008 | Wescott et al. |
| 2008/0050602 A1 | 2/2008 | Spraul et al. |
| 2009/0098387 A1 | 4/2009 | Brady et al. |
| 2010/0093896 A1 | 4/2010 | Spraul et al. |

FOREIGN PATENT DOCUMENTS

| | | |
|---|---|---|
| WO | 2008011455 | 1/2008 |
| WO | 2011025911 | 3/2011 |

OTHER PUBLICATIONS

Cinnamon S. et al., "Adhesion properties of Poly(hexamethylene diisocyanate) obtained by organotin catalysis", European Polymer Journal, Pergamon Press Ltd., Oxford, GB, vol. 16 No. 2, Jan. 1, 1980, pp. 147-148.
International Search Report, PCT/US2011/038132, Dec. 1, 2011, pp. 1-2.

*Primary Examiner* — Michael Orlando
(74) *Attorney, Agent, or Firm* — Michael Herman; Joanne Rossi

(57) ABSTRACT

Disclosed is an adhesive composition comprising a protein component, an AE adduct component and an isocyanate component. Also disclosed is a composite and a method of making a composite comprising a substrate and the adhesive composition of the present invention.

10 Claims, No Drawings

PROTEIN ADHESIVE FORMULATIONS WITH AMINE-EPICHLOROHYDRIN AND ISOCYANATE ADDITIVES

This application claims the benefit of U.S. provisional application No. 61/348,432, filed May 26, 2010, the entire contents of which are hereby incorporated by reference

FIELD OF THE INVENTION

This invention is directed towards adhesive compositions that comprise a combination of a protein source, an amine-epichlorohydrin adduct (AE) and an isocyanate-functional material.

BACKGROUND OF THE INVENTION

Adhesives derived from protein-containing soy flour first came into general use during the 1920's (U.S. Pat. Nos. 1,813,387, 1,724,695 and 1,994,050). Soy flour suitable for use in adhesives was, and still is, obtained by removing some or most of the oil from the soybean, yielding a residual soy meal that was subsequently ground into extremely fine soy flour. Typically, hexane is used to extract the majority of the non-polar oils from the crushed soybeans, although extrusion/extraction methods are also suitable means of oil removal. The resulting soy flour was then denatured (i.e., the secondary, tertiary and/or quaternary structures of the proteins were altered to expose additional polar functional groups capable of bonding) with an alkaline agent and, to some extent, hydrolyzed (i.e., the covalent bonds were broken) to yield adhesives for wood bonding under dry conditions. However, these early soybean adhesives exhibited poor water resistance, and their use was strictly limited to interior applications, thus, they were largely displaced by fossil fuel adhesives that were primarily based on formaldehyde. More recently, there has been a need in the wood adhesives industry to produce more environmentally friendly products, such as those having decreased levels of formaldehyde emissions. Protein adhesives once again become an option, as long as their water resistance could be enhanced. The amine-epichlorohydrin adduct/soy "AE/soy" adhesives fill a need in the marketplace for no added formaldehyde (NAF) adhesives that comply with laws regulating formaldehyde emissions in wood products (California Air Resource Board, "AIRBORNE TOXIC CONTROL MEASURE TO REDUCE FORMALDEHYDE EMISSIONS FROM COMPOSITE WOOD PRODUCTS", Apr. 26, 2007, and the Formaldehyde Standards for Composite Wood Products Act, Jul. 7, 2010) and to meet voluntary standards for environmentally responsible building such as the U.S. Green Building Council's (USGBC) Leadership in Energy and Environmental Design (LEED) Rating System. AE/soy adhesives also have a marked improvement in water resistance as compared to the traditional soy based adhesives.

Amine-epichlorohydrin polymers (AE polymers) have been used in combination with proteins as adhesives for wood products (U.S. Pat. Nos. 7,060,798 and 7,252,735; U.S. Patent Applications 2008/0021187, 2008/0050602 and 2008/0292886). AE/soy combinations have been demonstrated to be effective and robust adhesives for plywood in commercial systems showing greatly improved performance than traditional soy-based adhesives under both dry and wet conditions. The AE/soy adhesives have been demonstrated to be effective replacements for formaldehyde-based adhesives such as urea-formaldehyde (UF) adhesives. However, there are still some areas where the performance of these materials can be improved. In particular, adhesive strength with certain difficult to bond wood types has been a challenge with these adhesives. Some of the wood types that can be problematical for bonding are maple, hickory and fumed yellow birch. Other areas where the performance of AE/soy adhesives can benefit from additional improvement is in the area of higher bending and stiffness strengths when used as a binder resin for particleboard (PB) or medium density fiberboard (MDF) and also for general adhesive bonds strength improvement under wet conditions. It is also desirable to reduce the level of the AE additive in an AE/soy adhesive since the AE additive is a more expensive ingredient than soy flour.

Wood adhesives based on the combination of soy and AE resins are well known (U.S. Pat. No. 3,494,750; U.S. Pat. No. 7,252,735; U.S. Pat. No. 7,060,798). A number of patent applications have been filed describing improvements to this technology such as the use of low viscosity PAE resins (U.S. Patent publication number 20080050602), the preparation and use of sprayable adhesives for PB and MDF (U.S. Patent publication numbers 2007/073771, 2009/0098387, and 2010/046898), and the use of stain-preventing additives (U.S. Patent publication number 2008/0292886). Although AE/soy combinations have been demonstrated to be effective and robust adhesives for plywood, PB and MDF in commercial systems there are still some areas where the performance of these materials can be improved.

BRIEF SUMMARY OF THE INVENTION

The present invention relates to an adhesive composition comprising a protein component, an AE adduct component and an isocyanate component. The present invention also relates to a composite and a method of making a composite comprising a substrate and the adhesive composition of the present invention.

An AE adduct is a reaction product of epichlorohydrin with an amine functional material.

Surprisingly, it has been seen that the AE adduct/protein/isocyanate combinations provide improved bonding of difficult to bond veneers such as fumed yellow birch and excellent bonding to more easily bonded veneers with a lower level of total additive in the adhesive formulation, compared to an AE adduct used by itself as an additive. For purposes of this invention the AE adduct component and the isocyanate component are additives. One example of an AE adduct is polyamidoamine epichlorohydrin (PAE). In addition, it has been seen that the AE adduct/soy protein/isocyanate combinations provides improved bending strength and stiffness when used as binder in particleboard (PB) or medium density fiberboard (MDF). Soy is a preferred protein source.

It has been discovered that the use of an isocyanate in a PAE/soy adhesive can provide significant improvement in the bonding properties of the adhesive. Water-dispersible aliphatic isocyanates are preferred over aromatic isocyanates due to the much lower viscosity of formulations made with aliphatic isocyanates compared to aromatic isocyanates, but either one is beneficial.

DETAILED DESCRIPTION OF THE INVENTION

The present invention provides an adhesive composition comprising (a) a protein component, (b) an AE adduct component and (c) an isocyanate component. The present invention also relates to a composite and a method of making a composite comprising a substrate and the adhesive composition of the present invention.

In particular, adhesive strength with certain difficult to bond wood types has been a challenge with these adhesives. Some of the wood types that can be problematical for bonding are maple, hickory and fumed yellow birch. Other areas where the performance of AE/soy adhesives can benefit from additional improvement is in the area of higher bending and stiffness strengths when used as a binder resin for particleboard (PB) or medium density fiberboard (MDF) and also for general adhesive bonds strength improvement under wet conditions. It is also desirable to reduce the level of the AE additive in an AE/soy adhesive since the AE additive is a more expensive ingredient than soy flour.

Suitable proteins for use in the present invention include casein, blood meal, feather meal, keratin, gelatin, collagen, gluten, wheat gluten (wheat protein), whey protein, zein (corn protein), rapeseed meal, sunflower meal and soy protein. Preferably the protein is a plant based protein.

Soy is a preferred source of protein for the current invention. Soy can be used in the form of soy protein isolates, soy concentrates, soy flour, soy meal or toasted soy. Soy flour suitable for use in adhesives can be obtained by removing some or most of the oil from the soybean, yielding a residual soy meal that is subsequently ground into extremely fine soy flour. For purposes of this invention, the term soy protein includes soy flour unless otherwise specified.

Typically, hexane is used to extract the majority of the non-polar oils from the crushed soybeans, although extrusion/extraction methods are also suitable means of oil removal. Residual hexane in the extracted soy flakes is typically removed by one of two processes: a desolventiser toaster (DT) process or by using a flash desolventiser system (FDS). The use of the DT process results in a more severe heat treatment of the soy (maximum temperature of about 120° C.; 45-70 minutes residence time) than the FDS process (maximum temperature of about 70° C.; 1-60 seconds residence time). The DT process results in a darker product typically referred to as soy meal or toasted soy. These terms will be used interchangeably to refer to soy products processed by the DT method.

The ability of the protein portion of the soy product to be dissolved or dispersed in water is measured by the Protein Dispersibility Index (PDI) test. This test has been described as follows: "For this test, a sample of soybeans is ground, mixed in a specific ratio with water, and blended at a set speed (7,500 rpm) for a specific time (10 minutes). The nitrogen contents of the ground soybeans and of the extract are determined using the combustion method. The PDI value is the quotient of the nitrogen content of the extract divided by the nitrogen content of the original bean. (Illinois Crop Improvement Association Inc. website: http://www.ilcrop.com/ipglab/soybtest/soybdesc.htm, accessed Jul. 27, 2008).

The protein portion of DT-processed soy products have a lower solubility/dispersibility in water than the soy products processed by the FDS method as indicated by lower PDI values. Soy meals (toasted soy), typically have PDI values of 20 or less, whereas the FDS-processed soy products have PDI values ranging from 20 to 90.

Soy protein is commonly obtained in the form of soy flour by grinding processed soy flakes and passing through a 100-200 mesh screen. The soy flour can be further purified (usually by solvent extraction of soluble carbohydrates) to give soy protein concentrate. Defatted soy can be further purified to produce soy protein isolate (SPI).

The protein may be pretreated or modified to improve its solubility, dispersibility and/or reactivity. The soy protein may be used as produced or may be further modified to provide performance enhancements. U.S. Pat. No. 7,060,798, the entire content of which is herein incorporated by reference, teaches methods of modifying protein and their incorporation in to an adhesive. It is contemplated that modified protein or modified soy flour can be used with the present invention. Another protein treatment is the use of effective modifiers, such as sodium metabisulfite, to provide low viscosity preparations which has been disclosed in U.S. Patent publication number 2010/0093896 the entire content of which is herein incorporated by reference.

The protein may also be solvated, denatured or dispersed by the addition of urea or non urea diluents (U.S. Patent publication numbers 2007/073771, 2009/0098387, and 2010/046898). Generally, this is observed when producing binders for PB or MDF.

One preferred type of soy for use in the present invention is soy flour, with a PDI of 20 or higher.

The AE adduct component of the present invention is typically a water-soluble material that contains primary amine, secondary amine that have been reacted with epichlorohydrin. Examples of some polymers that may be functionalized with epichlorohydrin and used in the present invention are: polyamidoamines, polydiallylamine, polyethylenimine [PEI], polyvinyl amine and chitosan.

One preferred class of AE adducts for the present invention is polyamidoamine-epichlorohydrin (PAE) resins. These polymers are characterized by the presence of reactive azetidinium functionality and amide functionality in the backbone. These thermosetting materials rely on the azetidinium functionality as the reactive moiety. Some particularly useful amine-epichlorohydrin polymers are Hercules® CA1400, Hercules® CA1920A, Hercules® CA1000 and Hercules® CA1100, all available from Hercules Incorporated, Wilmington, Del. PAE resins are well-known in the art, mainly for use as wet-strengthening agents for paper products. Another type of PAE resin that is particularly well-suited for use in this invention is disclosed in U.S. Patent Publication US2008/0050602.

AE adducts are produced as aqueous solutions with solids contents ranging from about 10% to about 60%.

Isocyanate polymers are highly reactive materials that are used widely in adhesive systems, and are used extensively as components of wood adhesive formulations. The most commonly used isocyanate materials are based on aromatic isocyanates such as methylene-diphenyl-diisocyanate) [MDI] and toluene diisocyanate [TDI]. Aliphatic isocyanates are also used, examples include, but are not limited to, hexamethylendiisocyanate [HDI] and isophorone diisocyanate [IDI].

Isocyanate additives are generally well known in the art and have been extensively used in adhesive compositions in monomeric, oligomeric and/or polymeric form. It is more common that these isocyanate be used in their polymeric form. This results in more rapid cure, higher viscosity, and safer usage (less free monomer). To function as an effective cross-linking agent, the isocyanate must have at least two reactive isocyanate groups.

Suitable isocyanate additives for use in the present invention can include any liquid or solid organic isocyanate containing at least two reactive isocyanate groups. Suitable isocyanate additives may contain aliphatic, cycloaliphatic, araliphatic and/or aromatic isocyanate groups. Mixtures of polyisocyanates are also suitable. The following are specific examples of suitable isocyanates: hexamethylene diisocyanate (HDI); 2,2,4-trimethylhexamethylene diisocyanate; 2,4,4-trimethyihexamethylene diisocyanate; isophorone diisocyanate (IPDI); bis(4-isocyanatocyclohexyl)methane (hydrogenated MDI); biuret derivatives of various diisocyanates including, for example, hexamethylene diisocyanate (commercially available under the trade designation Desmodur® of Bayer MaterialScience, Pittsburgh, Pa.); uretdione derivatives of various diisocyanates including, for example, hexamethylene diisocyanate and IPDI; isocyanurate derivatives of various diisocyanates including, for example, hexamethylene diisocyanate (commercially available under the trade designation Desmodur® N 3390 of Bayer MaterialScience, Pittsburgh, Pa.) and IPDI (commercially available under the trade designation IPDI T 1890 polyisocyanate of Huls America, Inc., Piscataway, N.J.); and urethane adducts of diisocyanates with polyols such as, for example, ethylene glycol, propylene glycol, neopentyl glycol, trimethylolpropane, pentaerythritol and the like, as well as oligomeric and polymeric polyols.

Isocyanates are also available as water-dispersible formulations. The water-dispersible isocyanate formulations are a preferred type of isocyanate for use in this invention. The water-dispersible isocyanates are usually based on HDI (hexamethylene diisocyanate). Some examples of these materials are Bayhydur® 302, Bayhydur® 303 and Bayhydur® XP 2547 available from Bayer MaterialScience, Pittsburgh Pa.; Easaqua® XM 501 and Easaqua® 502 available from Perstorp, Cranbury N.J.; Dorus® R-400, available from Henkel Corporation, Elgin Ill. and Basonat® F 200 WD available from BASF SE, Ludwigshafen, Germany.

The combination of AE resins and isocyanates in a soy-based adhesive provides functionalities which results in a synergistic improvement in adhesive properties.

The ratio of protein component to the total of the AE adduct component and isocyanate component in the composition can vary from 1:2 to about 1000:1, preferably from about 1:2 to about 100:1, and most preferably between 1:2 to 10:1 based on dry weight. In some embodiments the ratio is from about 1:1 to about 100:1, preferably from 1.5:1 to about 15:1.

The ratio of AE adduct to isocyanate component in the formulation on a dry weight basis can range from about 100:1 to 1:10, more preferably from about 20:1 to 1:5 and more preferably from 20:1 to 1:1, more preferably from 15:1 to 1:1, most preferably from about 10:1 to 1:1. The preferred AE adduct is PAE.

The total solids content of the composition can range from 5% to 75%, more preferably in the range of 25% to 65% and most preferably between 30% and 60%. In one preferred embodiment the solids content of the composition is greater than 25%, in another preferred embodiment the solids content is greater than 30%.

The compositions of the invention are prepared by combining the components (the protein, the AE adduct, and the isocyanate) in an aqueous medium. The isocyanate-functional material can be added at any point in the process. In one embodiment of the invention the components are added together and then mixed. Adding the isocyanate at the end of the mixing process can give a lower viscosity product than if the isocyanate were added at the beginning of the process. Addition of the isocyanate to a soy/AE adduct mixture immediately prior to use via an in-line mixer is another mode in which the isocyanate can be used in the adhesive composition. After all of the components have been added they are thoroughly mixed to produce a homogeneous material. Additional materials can be added to the formulation such as non-aqueous diluents or solvents, defoamers, viscosity modifiers, surfactants and acids or bases used for pH adjustment. In yet another embodiment of the invention the soy/AE adduct mixture and the isocyanate component are combined by applying both to a substrate.

The pH of this inventive composition can range from about 4.5 to about 9, more preferably from about 5 to less than 8 and most preferably from about 5.5 to about 7.5. Lower pH values provide better viscosity stability, but adhesive performance, most notably the cure speed, will be compromised if the pH is too low.

The viscosity of the composition is dependent on the ratio of ingredients, total solids, and the final pH. The limitation of viscosity is ultimately equipment dependent. Higher viscosity materials require more powerful and more costly mixers, pumps and processing equipment.

Preferable the viscosity is less than 200,000 cP (centipoise—as measured on a Brookfield viscometer at 10 RPM), more preferably less than 100,000 cP, even more preferably less than 50,000 cP. The viscosity can range from 100 to 200,000 cP, more preferably 200 to 100,000 cP and most preferably between 200 and 50,000 cP.

Another embodiment of the invention is the application of the adhesive compositions for making engineered wood products and other composite materials. The compositions can be applied by a variety of methods such as roller coating, knife coating, extrusion, curtain coating, foam coaters, paddle blenders and spray coaters, one example of which is the spinning disk resin applicator. Although requirements vary for different grades and types of applications, lower viscosity is a benefit when using these application techniques, especially for spraying of adhesive formulations when producing PB or MDF. Lower viscosity formulations are typically used in the production of PB and MDF, while higher viscosity formulations may be used in the production of plywood.

The adhesive composition of the present invention can be used in many industrial applications. For instance, the adhesive composition may be applied to a suitable substrate in amounts ranging from 1 to 25% by weight, preferably in the range of 1 to 10% by weight and most preferably in the range of 2 to 8% by weight based on the dry weight of the substrate.

After application of the adhesive composition to the substrate the adhesive/substrate combination is subjected to heat and pressure to form a composite.

A number of materials can be prepared using the adhesive of the invention including particleboard, oriented strand board (OSB), waferboard, fiberboard (including medium-density and high-density fiberboard), parallel strand lumber (PSL), laminated strand lumber (LSL), oriented strand lumber (OSL) and other similar products. Lignocellulosic materials such as wood, wood pulp, straw (including rice, wheat or barley), flax, hemp and bagasse can be used in making thermoset products from the invention.

The lignocellulosic product is typically made by blending the adhesive with a substrate in the form of powders, particles, fibers, chips, flakes fibers, wafers, trim, shavings, sawdust, straw, stalks or shives and then pressing and heating the resulting combination to obtain the cured material. The moisture content of the lignocellulosic material should be in the range of 2 to 20% before blending with the adhesive of the present invention.

The adhesive of the present invention also may be used to produce plywood or laminated veneer lumber (LVL). For instance, in one embodiment, the adhesive may be applied onto veneer surfaces by roll coating, knife coating, curtain coating, or spraying. A plurality of veneers is then laid-up to form sheets of required thickness. The mats or sheets are then placed in a press (e.g., a platen), usually heated, and compressed to effect consolidation and curing of the materials into a board. Fiberboard may be made by the wet felted/wet pressed method, the dry felted/dry pressed method, or the wet felted/dry pressed method.

In addition to lignocellulosic substrates, the adhesive compositions can be used with substrates such as glass wool, glass fiber and other inorganic materials. The adhesive compositions can also be used with combinations of lignocellulosic and inorganic substrates.

EXAMPLES

Examples 1 through 15 compare and contrast the viscosity and adhesion properties of PAE/soy adhesive formulations with isocyanate/soy formulations and isocyanate/PAE/soy formulations.

Comparative Example 1

This was a comparative example of a dispersion of soy flour mixed in water with small quantities of defoamer and sodium metabisulfite (SMBS) as a viscosity modifier. A quantity of 140.00 g DI water was added to a 600 mL stainless steel beaker along with 0.80 g SMBS (>99%, Aldrich Chemical Company, Milwaukee Wis.) and 0.32 g Advantage 357 defoamer (available from Hercules Incorporated, Wilmington Del.). The mixture was stirred for 2 minutes with a bladed stirrer attached to a mechanical mixer. While continuing to stir the mixer a quantity of 84.21 g Soyad®TS9200 soy flour (Hercules Incorporated, Wilmington Del.) was added to the mixture. Vigorous stirring was continued for 8 minutes after the soy flour had all been added. At this point the pH and viscosity of the preparations was measured. Viscosity was measured using a Brookfield RV viscometer using a #6 spindle at 10 rpm after stirring the sample vigorously for 30 seconds. The properties of this formulation can be found in Table 1.

Comparative Example 2

This was comparative example of a dispersion of soy flour combined with PAE resin. A quantity of 91.39 g DI water was added to a 600 mL stainless steel beaker along with 70.00 g Hercules® CA1920A (20% solids aqueous solution of PAE resin available from Hercules Incorporated, Wilmington Del.), 0.70 g SMBS (>99%, Aldrich Chemical Company, Milwaukee Wis.) and 0.32 g Advantage® 357 defoamer (Hercules Incorporated, Wilmington Del.) and the mixture was stirred for 2 minutes with a bladed stirrer attached to a mechanical mixer. While continuing to stir the mixer a quantity of 73.68 g Soyad® TS9200 soy flour (Hercules Incorporated, Wilmington Del.) was added to the mixture. Vigorous stirring was continued for 8 minutes after the soy flour had all been added. At this point the pH and viscosity of the preparations was measured. Viscosity was measured using a Brookfield RV viscometer using a #6 spindle at 10 rpm after stirring the sample vigorously for 30 seconds. The properties of this formulation can be found in Table 1.

Example 3

A dispersion of soy flour with added pMDI was prepared as a comparative example. A quantity of 134.95 g DI water was added to a 600 mL stainless steel beaker along with 0.70 g SMBS (>99%, Aldrich Chemical Company, Milwaukee Wis.) and 0.28 g Advantage® 357 defoamer (Hercules Incorporated, Wilmington Del.) and the mixture was stirred vigorously for 2 minutes with a bladed stirrer attached to a mechanical mixer. A quantity of 7.00 g Rubinate® 1840 pMDI (Huntsman Polyurethanes, The Woodlands Tex.) was added to the stirred mixture and was mixed vigorously for 2 minutes. While continuing to stir the mixture a quantity of 73.68 g Soyad® TS9200 soy flour (Hercules Incorporated, Wilmington Del.) was added to the mixture. Vigorous stirring was continued for 8 minutes after the soy flour had all been added. The properties of this formulation can be found in Table 1.

Example 4

This Example was prepared in the same manner as Example 3 except that Dorus® R-400 pHDI (Henkel Inc., Elgin Ill.) was used in place of Rubinate® 1840 pMDI. The properties of this formulation can be found in Table 1.

Example 5

This Example was prepared in the same manner as Example 3 except that 14.00 g of Rubinate® 1840 pMDI were used instead of 7.00 g and 147.39 g DI water were used instead of 134.95 g. The properties of this formulation can be found in Table 1.

Example 6

This example was prepared in the same manner as Example 4 except that 14.00 g of Dorus® R-400 pHDI were used instead of 7.00 g and 147.39 g DI water were used instead of 134.95 g. The properties of this formulation can be found in Table 1.

Example 7

A quantity of 120.95 g DI water was added to a 600 mL stainless steel beaker along with 17.50 g Hercules® CA1920A (Hercules Incorporated, Wilmington Del.), 0.70 g SMBS (>99%, Aldrich Chemical Company, Milwaukee Wis.) and 0.28 g Advantage® 357 defoamer (Hercules incorporated, Wilmington Del.) and the mixture was stirred vigorously for 2 minutes with a bladed stirrer attached to a mechanical mixer. A quantity of 3.50 g Rubinate® 1840 pMDI (Huntsman Polyurethanes, The Woodlands Tex.) was added to the stirred mixture and was mixed vigorously for 2 minutes. While continuing to stir the mixture a quantity of 73.68 g Soyad® TS9200 soy flour (Hercules Incorporated, Wilmington Del.) was added to the mixture. Vigorous stirring was continued for 8 minutes after the soy flour had all been added. The properties of this formulation can be found in Table 1.

Example 8

This Example was prepared in the same manner as Example 7 except that Dorus® R-400 pHDI (Henkel Inc., Elgin Ill.) was used in place of Rubinate® 1840 pMDI. The properties of this formulation can be found in Table 1.

Example 9

This Example was prepared in the same manner as Example 7 except that 35.00 g of Hercules® CA1920A and 113.17 g DI water were used. The properties of this formulation can be found in Table 1.

Example 10

This Example was prepared in the same manner as Example 9 except that Dorus® R-400 pHDI (Henkel Inc., Elgin Ill.) was used in place of Rubinate® 1840 pMDI. The properties of this formulation can be found in Table 1.

Example 11

This Example was prepared in the same manner as Example 8 except that 7.00 g Dorus® R-400 pHDI (Henkel Inc., Elgin Ill.) and 127.17 g DI water were used. The properties of this formulation can be found in Table 1.

Example 12

This Example was prepared in the same manner as Example 11 except that 35.00 g Hercules® CA1920A and 119.39 g DI water were used. The properties of this formulation can be found in Table 1.

Example 13

A PAE/soy adhesive was prepared in a similar manner as Example 2 except that 35.00 g Hercules® CA1920A and 106.95 g DI water were used.

Example 14

A PAE/soy adhesive was prepared in a similar manner as Example 2 except that 52.50 g Hercules® CA1920A and 99.17 g DI water were used.

Table 1 shows viscosity data for comparative examples and a number of PAE/soy adhesive formulations made with added isocyanates. In this study the effect of an aromatic isocyanate (Rubinate® 1840 pMDI; available from Huntsman Polyurethanes, The Woodlands Tex.) and a water-dispersible aliphatic isocyanate (Dorus® R-400 pHDI, available from Henkel Corp., Elgin Ill.) on viscosity properties of PAE/soy formulations was examined.

The dispersion of soy flour in water (Example 1) showed very little change in viscosity with time. Example 2 is another comparative example where 20 dry parts per hundred parts soy ("PHS") of Hercules® CA1920A PAE resin was included in the formulation. This formulation has a lower viscosity than the soy flour alone, but the viscosity increases steadily with time and by 19 hours has surpassed the viscosity of the soy flour in water dispersion (Example 1). Examples 3 and 4 compare the effects of the aromatic isocyanate (pMDI) and the aliphatic isocyanate (pHDI) at a level of 10 PHS with soy flour. The formulation containing the aromatic isocyanate has a viscosity more than an order of magnitude greater than the formulation with the aliphatic isocyanate and had gelled after 24 hours whereas the aliphatic isocyanate formulation was still fluid with a viscosity of 40,900 cP after 24 hours. Another comparison of the aromatic isocyanate and aliphatic isocyanate combined with soy flour is seen in examples 5 and 6 where the isocyanates have been added at a level of 20 PHS. The 20 PHS pMDI formulation (Example 5) has an even higher viscosity than the 10 PHS pMDI formulation (Example 3). The 20 PHS pMDI formulation had gelled after about 6 hours. By comparison, the 20 PHS pHDI formulation (Example 6) is lower in viscosity than the 20 PHS pMDI formulation by a factor of 32 and is also lower in viscosity than the 10 PHS pHDI formulation (Example 4).

Examples 7 through 10 compare the two different isocyanates in adhesive formulations containing both soy flour and PAE resin with the odd-numbered examples being made with pMDI and the even-numbered examples being made with pHDI. The pHDI formulations exhibited lower viscosity values and had a much lower rate of viscosity increase with time.

Examples 11 and 12 are additional examples of PAE/soy/pHDI formulations that have low initial viscosity values and are still fluid 18 to 20 hours after being made.

TABLE 1

Viscosity Properties of PAE/Soy Adhesive Formulations with added Isocyanates (1)

| Example Number | PAE Level (PHS) | Isocyanate Type | Isocyanate Level (PHS) | Time (hrs) | pH | RV Viscosity (cP) | Spindle/RPM |
|---|---|---|---|---|---|---|---|
| 1 | 0 | None | None | 0.00 | 6.01 | 28,200 | 6/10 |
|  |  |  |  | 2.07 | 6.00 | 32,000 | 6/10 |
|  |  |  |  | 25.38 | 5.93 | 34,700 | 6/10 |
|  |  |  |  | 49.33 | 5.92 | 32,000 | 6/10 |
| 2 | 20 | None | None | 0.00 | 5.36 | 14,100 | 6/10 |
|  |  |  |  | 2.75 | 5.28 | 21,300 | 6/10 |
|  |  |  |  | 19.75 | 5.55 | 39,000 | 6/10 |
| 3 | 0 | pMDI | 10 | 0.00 | 5.85 | 132,000 | 7/10 |
|  |  |  |  | 1.00 | 5.80 | 573,300 | 7/10 |
|  |  |  |  | 23.49 | — | Gelled | 6/10 |
| 4 | 0 | pHDI | 10 | 0.00 | 6.03 | 11,300 | 6/10 |
|  |  |  |  | 7.33 | 6.18 | 23,000 | 6/10 |
|  |  |  |  | 24.22 | 6.10 | 40,900 | 6/10 |
| 5 | 0 | pMDI | 20 | 0.00 | 5.87 | 242,700 | 6/10 |
|  |  |  |  | 5.47 | — | Gelled | 6/10 |
| 6 | 0 | pHDI | 20 | 0.00 | 6.08 | 7,600 | 6/10 |
|  |  |  |  | 3.50 | 6.08 | 12,500 | 6/10 |
|  |  |  |  | 20.50 | 6.07 | 132,400 | 6/10 |
| 7 | 5 | pMDI | 5 | 0.00 | 5.69 | 66,700 | 6/10 |
|  |  |  |  | 3.20 | 5.62 | 165,200 | 7/10 |
| 8 | 5 | pHDI | 5 | 0.00 | 5.82 | 12,200 | 6/10 |
|  |  |  |  | 1.67 | 5.72 | 20,500 | 6/10 |
|  |  |  |  | 18.67 | 5.74 | 70,600 | 6/10 |
| 9 | 10 | pMDI | 5 | 0.00 | 5.51 | 74,400 | 6/10 |
|  |  |  |  | 2.31 | 5.46 | 174,000 | 7/10 |
| 10 | 10 | pHDI | 5 | 0.00 | 5.65 | 10,300 | 6/10 |
|  |  |  |  | 1.07 | 5.58 | 13,700 | 6/10 |
|  |  |  |  | 18.08 | 5.63 | 71,200 | 6/10 |
| 11 | 5 | pHDI | 10 | 0.00 | 5.92 | 10,300 | 6/10 |
|  |  |  |  | 6.68 | 5.89 | 40,900 | 6/10 |
|  |  |  |  | 23.57 | 5.80 | 107,600 | 6/10 |
| 12 | 10 | pHDI | 10 | 0.00 | 5.63 | 8,400 | 6/10 |
|  |  |  |  | 4.00 | 5.59 | 16,900 | 6/10 |
|  |  |  |  | 20.90 | 5.69 | 144,400 | 6/10 |

(1) All formulations have 36% solids and contain 1.0 PHS SMBS.
PHS = Parts per Hundred parts Soy Example 15

Plywood panels were prepared using the adhesive formulations of Examples 1 through 14. These 3-ply panels were fabricated using 12"×12" poplar veneers with average thickness of 3.6 mm (0.14"). The veneers were stored in an 80° F./30% relative humidity conditioning room for several days or more prior to making the panels. Adhesive was applied to both sides of the center veneer at a level of 20 to 22 g per square foot. Veneer grain direction was alternated by 90° throughout the panel (orientation of the core veneer grain was perpendicular to the face and back veneer orientation per a typical plywood construction). The time to apply the adhesive to complete the total assembly was 2-4 minutes. The 3-ply assemblies with wet glue were placed under a 14"×14" board with a 1 gallon water weight on top for 15 minutes (to simulate a commercial stand time) prior to being hot pressed. After the stand time the panels were hot pressed for 3 minutes at 250° F. and 125 psi. In this example, no cold press was used prior to the hot pressing step. The hot pressed panels were held for 48 hours in a 70° F./50% relative humidity conditioning before being cut. After being cut the test samples were conditioned in a 70° F./50% relative humidity room for at least 24 hours prior to testing.

Dry and wet shear strength testing was performed using ASTM method D-906 and European Standard EN-314 as guides. Wet shear samples were soaked at ambient temperature for 24 hours before testing. All of the shear samples were tested with lathe checks in the closed orientation. For each condition a total of 4 dry shear and 6 wet shear samples were tested.

Three-cycle soak testing of plywood panels was performed according to ANSI/HPVA HP-1-2009 using 4 samples per test. The 3-cycle soak test coupons were also graded on a 0 to 10 scale where 0 corresponded to no delamination at all in the bond line and 10 corresponded to complete delamination of the adhesive bond. A score of 6 or above will qualify as a failure according to the standard. The complete set of scoring criteria are shown in Table 2.

TABLE 2

Scoring Criteria for 3-Cycle Soak Samples

| Grade | Pass/Fail | Bond Line Characteristics |
|---|---|---|
| 0 | Pass | No delamination at all in bond line |
| 1 | Pass | Minimal delamination, <0.1" |
| 2 | Pass | Minimal delamination, <0.25" |
| 3 | Pass | Moderate delamination, <0.5" |
| 4 | Pass | Moderate delamination, <1" |
| 5 | Pass | Major delamination, <2" |
| 6 | Fail | Major delamination, 2-3" |
| 7 | Fail | Severe delamination, 3-4" |
| 8 | Fail | Very severe delamination, 4-5" |
| 9 | Fail | Near complete veneer separation |
| 10 | Fail | Complete veneer separation | dry shear strength and wet shear strength of the PAE/soy examples were substantially better than the soy-only example.

Most of the formulations with soy flour and isocyanate, without any PAE, (Examples 15-E, 15-F, 15-G and 15-H) did not perform well in the 3-cycle soak test. Example 15-G with 20 phs pMDI gave a 75% passing score for the 3-cycle soak test and showed the best shear strength properties of this group, but had a very high viscosity value (242,000 cP) and a significantly lower wet shear strength when compared to the same PAE level in example 15-D (124 vs. 217).

The adhesive formulations with 10 phs PAE with either 5 or 10 phs isocyanate (Examples 15-K, 15-L, and 15-N) all showed 100% passing and gave scores of 0 (no delamination at all). The dry and wet shear strength values were all very good. The combination of 10 phs PAE with 5 phs isocyanate (Examples 15-K & 15-L) showed much better wet shear properties than the 15 phs PAE adhesive formulation (Example 15-B). Combinations of 5 phs pHDI with 5 and 10 phs PAE (Examples 15-J and 15-M, respectively) gave very high dry shear values with 100% dry wood failure, much better dry shear properties than the 20 phs PAE adhesive formulation (Ex. 15-D).

Examples 16 through 20 provide comparisons of adhesive performance of PAE/soy adhesive formulations with isocyanate/PAE/soy adhesive formulations when used to bond fumed yellow birch, a difficult to bond wood type.

Comparative Example 16

This is a comparative example of a typical PAE/soy adhesive formulation. To a 600 mL stainless steel beaker was

TABLE 3

Properties of 3-Ply Poplar Panels Made with Test Formulations

| | Adhesive Formulations | | | Panel Testing | | | | | |
|---|---|---|---|---|---|---|---|---|---|
| | | | Isocyanate | 3-Cycle Soak | | Shear Strength Testing | | | |
| Example Number | Adhesive Example Number | PAE Level (phs) | Level (phs) and Type | Avg. Score | % Pass | Dry Shear (psi) | % Dry WF | Wet Shear (psi) | % Wet WF |
| 15-A | 1 | 0 | 0 | 10.00 | 0% | 106 | 1 | 0 | 0 |
| 15-B | 13 | 10 | 0 | 0.50 | 100% | 316 | 78 | 130 | 3 |
| 15-C | 14 | 15 | 0 | 3.50 | 25% | 285 | 63 | 139 | 2 |
| 15-D | 2 | 20 | 0 | 0.38 | 100% | 389 | 90 | 217 | 8 |
| 15-E | 3 | 0 | 10 pMDI | 10.00 | 0% | 254 | 54 | 0 | 0 |
| 15-F | 4 | 0 | 10 pHDI | 10.00 | 0% | 182 | 0 | 0 | 0 |
| 15-G | 5 | 0 | 20 pMDI | 2.00 | 75% | 267 | 41 | 124 | 1 |
| 15-H | 6 | 0 | 20 pHDI | 10.00 | 0% | 271 | 3 | 0 | 0 |
| 15-I | 7 | 5 | 5 pMDI | 5.50 | 0% | 243 | 83 | 64 | 0 |
| 15-J | 8 | 5 | 5 pHDI | 4.00 | 25% | 471 | 100 | 104 | 0 |
| 15-K | 9 | 10 | 5 pMDI | 0.00 | 100% | 277 | 86 | 194 | 9 |
| 15-L | 10 | 10 | 5 pHDI | 0.00 | 100% | 455 | 100 | 211 | 3 |
| 15-M | 11 | 5 | 10 pHDI | 4.38 | 50% | 312 | 66 | 93 | 0 |
| 15-N | 12 | 10 | 10 pHDI | 0.00 | 100% | 357 | 78 | 195 | 0 |

Examples 15-A, 15-B, 15-C, 15-D, 15-E, 15-F 15-G and 15-H are comparative examples Panels made with the PAE/soy comparative examples (Examples 15-B, 15-C and 15-D) showed good properties compared to panel of comparative Example 15-A which contained only soy flour. The PAE/soy samples had better 3-cycle soak results. Although Example 15-C had only a 25% pass rate, the average score of 3.5 was better than the score of 10 for Example 15-A since a score of 10 indicates that the test samples all delaminated completely during the test. Both the added 38.40 g DI water, 57.00 g Hercules® CA1100 (Hercules Incorporated, Wilmington Del.) and 0.27 g SMBS. This mixture was stirred for 2 minutes with a bladed stirrer attached to a mechanical mixer. While continuing to stir the mixture a quantity of 48.00 g Soyad® TS9200 soy flour (Hercules Incorporated, Wilmington Del.) was added to the mixture. Vigorous stirring was continued for 8 minutes after the soy flour had all been added. The properties of this formulation can be found in Table 4.

Comparative Example 17

This is a comparative example of a typical PAE/soy adhesive formulation. To a 600 mL stainless steel beaker was added 38.40 g DI water, 57.00 g Hercules CA1100 (Hercules Incorporated, Wilmington Del.), 3.70 g glycerol (>99% pure, Aldrich Chemical Co., Milwaukee Wis.) and 0.27 g SMBS. This mixture was stirred for 2 minutes with a bladed stirrer attached to a mechanical mixer. While continuing to stir the mixture a quantity of 48.00 g Soyad® TS9200 soy flour (Hercules Incorporated, Wilmington Del.) was added to the mixture. Vigorous stirring was continued for 8 minutes after the soy flour had all been added. The properties of this formulation can be found in Table 4.

Example 18

To a 600 mL stainless steel beaker was added 38.40 g DI water, 57.00 g Hercules® CA1100 (Hercules Incorporated, Wilmington Del.) and 0.27 g SMBS. This mixture was stirred for 2 minutes with a bladed stirrer attached to a mechanical mixer. While continuing to stir the mixture a quantity of 48.00 g Soyad® TS9200 soy flour (Hercules Incorporated, Wilmington Del.) was added to the mixture. Vigorous stirring was continued for 8 minutes after the soy flour had all been added. A quantity of 4.00 g Dorus® R-400 pHDI (Henkel Inc., Elgin Ill.) was then added to the mixture and stirring was continued for another 2 minutes. The properties of this formulation can be found in Table 4.

Example 19

To a 600 mL stainless steel beaker was added 38.40 g DI water, 57.00 g Hercules® CA1100 (Hercules Incorporated, Wilmington Del.), 3.70 g glycerol (>99% pure, Aldrich Chemical Co., Milwaukee Wis.) and 0.27 g SMBS. This mixture was stirred for 2 minutes with a bladed stirrer attached to a mechanical mixer. While continuing to stir the mixture a quantity of 48.00 g Soyad® TS9200 soy flour (Hercules Incorporated, Wilmington Del.) was added to the mixture. Vigorous stirring was continued for 8 minutes after the soy flour had all been added. A quantity of 8.25 g Dorus® R-400 pHDI (Henkel Inc., Elgin Ill.) was then added to the mixture and stirring was continued for another 2 minutes. The properties of this formulation can be found in Table 4.

Example 20

The adhesive formulations of Examples 16 to 19 were made used to prepare plywood panels for testing. The plywood panels were 3-ply panels with a fumed yellow birch (FYB)/gum/poplar construction. Adhesive was applied to both sides of the center veneer at a level of 18 to 20 g per square foot. Veneer grain direction was alternated by 90° throughout the panel (orientation of the core veneer grain was perpendicular to the face and back veneer orientation). The 3-ply assemblies with wet glue were placed under an 14"×14" board with a 1 gallon water weight on top for 10 minutes (stand time) prior to being cold pressed. The panels were cold pressed for 5 minutes at 83 psi. The tack of the panels was evaluated out of the cold press using a qualitative scale of 0 (very poor tack and very poor consolidation of panel) to 5 (excellent tack and excellent consolidation of panel). After cold pressing the panels were hot pressed for 4 minutes at 230° F. and 153 psi. The panels were held for 48 hours in a 70° F./50% relative humidity conditioning before being cut. After being cut the test samples were conditioned in a 70° F./50% relative humidity room for at least 24 hours prior to testing.

Three-cycle soak testing was performed on these panels as described earlier. A dry bond evaluation (DBE) was also performed on the FYB/poplar bond (bond line 1). This procedure was carried out by separating the bonded veneers using a knife and qualitatively judging the strength of the bond and the amount of wood pull using a 0 to 5 DBE scale. In our DBE scale 0 corresponds to a very poor adhesive bond that can be separated with a minimal amount of force with no wood failure while a score of 5 is used for an excellent adhesive bond requiring significant force to disrupt it and exhibiting 100% wood failure. Results of the panel testing are in Table 4.

TABLE 4

PAE/Soy/pHDI Formulations and FYB/Gum/Poplar Panel Properties

| | | Adhesive Formulations | | | | | Panel Properties | | |
|---|---|---|---|---|---|---|---|---|---|
| Panel # | Adhesive Example Number | Glycerol | Added pHDI (phs) | Total Solids | Viscosity (1) (cP) | pH | Tack (2) | BL1 DBE (3) | 3-Cycle Soak % Pass |
| 20A | 16-Comparative | None | None | 39.90% | 56,400 | 5.54 | 4 | 1.75 | 0% |
| 20B | 17-Comparative | 2.50% | None | 41.40% | 45,700 | 5.39 | 4 | 2.25 | 0% |
| 20C | 18 | None | 8.8 | 41.50% | 26,800 | 5.50 | 4 | 4.25 | 100% |
| 20D | 19 | 2.40% | 18.1 | 44.60% | 22,450 | 5.47 | 5- | 5.00 | 100% |

(1) Viscosity measured using Brookfield RV viscometer with a #6 spindle @ 10 rpm.
(2) Tack evaluated on a scale of 0 to 5 where 1 = very poor tack and 5 = excellent tack.
(3) BL1 DBE = Bond Line 1 (FYB/gum) Dry Bond Evaluation. The dry adhesive bond was judged qualitatively for resistance to peel and wood pull using a scale of 0 to 5 where 0 = very poor bond quality with no wood pull and 5 = excellent bond quality with close to 100% wood pull.

Field and lab experience have shown that good bonding of the fumed yellow birch veneer is very difficult to achieve using both PAE/soy adhesives and conventional urea-formaldehyde (UF) adhesives.

Panel examples 20-A and 20-B were made with comparative examples of typical PAE/soy adhesive formulations used for plywood or engineered wood flooring (EWF) applications. Panel examples 20-C and 20-D were made with adhesive formulations that contained 8.8 and 18.1 PHS pHDI, respectively, and had lower viscosities than the comparative examples. Tack was as good as or better than the comparative examples and the dry bond evaluation (DBE) results were much better for the isocyanate-containing formulations than for the comparative examples demonstrating the significant improvement in bond strength over the PAE/soy system. Testing of the panels with ANSI/HPVA HP-1-2009 3-cycle soak test method showed a sharp difference between the comparative formulations and the experimental examples made using pHDI in addition to the PAE resin. The comparative examples both gave complete failure in the 3-cycle soak test while the panels made with formulations that contained pHDI passed the test at a level of 100%, again demonstrating the significant improvement in bond strength over the PAE/soy system.

Dry bond evaluation (DBE) of bond line 1 in these panels (fumed yellow birch-gum bond) also showed a surprising difference between the comparative examples and formulations of this invention. The panels made with the comparative formulations (Examples 20-A and 20-B) had DBE scores of 1.75 and 2.25 while the panels made with the inventive formulations (Examples 20-C and 20-D) had DBE scores of 4.25 and 5.00. This was a surprising difference in bond quality and wood failure. The comparative examples showed very little wood failure while the inventive examples exhibited almost complete wood failure for the fumed yellow birch-gum bond, again, demonstrating the significant improvement in bond strength over the PAE/soy system.

Examples 21 through 27 compare and contrast the viscosity and performance of a range of PAE/soy, isocyanate/soy and isocyanate/PAE/soy adhesive formulations when used to make 3-ply poplar panels with no cold press step.

Examples 21 to 26

These Examples were prepared by mixing varied quantities of water, PAE resin, isocyanate, soy flour, sodium metabisulfite and defoamer. The exact quantities of the additives used in these examples are shown in Table 5. Examples 21 and 22 are comparative examples. These formulations were prepared by adding DI water, Hercules® CA1920A PAE resin, if required, (available from Hercules Incorporated, Wilmington Del.) and SMBS in a 600 mL stainless steel beaker and mixing well for about 1 minute. After adding Soyad® TS9200 soy flour (available from Hercules Incorporated, Wilmington Del.) to this stirred mixture the combination was stirred vigorously for 8 minutes. Dorus® R-400 pHDI isocyanate was then added to the formulations that required it and the resulting mixture was stirred for an additional two minutes. At this point the pH and viscosity of the preparations was measured. Viscosity was measured using a Brookfield RV viscometer using a #6 spindle at 10 rpm. These values can be found in Table 5.

TABLE 5

Examples 21 through 26

| Example Number | g TS9200 Soy Flour | G CA1920A PAE Polymer | g Dorus R-400 | G SMBS | g A-357 Defoamer | g DI Water | pH | Viscosity (cP) (1) |
|---|---|---|---|---|---|---|---|---|
| 21-Comparative | 73.68 | 0.00 | 7.00 | 0.70 | 0.28 | 134.95 | 5.82 | 12,200 |
| 22-Comparative | 73.68 | 0.00 | 14.00 | 0.70 | 0.28 | 147.39 | 5.65 | 10,300 |
| 23 | 73.68 | 17.50 | 3.50 | 0.70 | 0.28 | 120.95 | 6.03 | 11,300 |
| 24 | 73.68 | 35.00 | 3.50 | 0.70 | 0.28 | 113.17 | 5.92 | 10,300 |
| 25 | 73.68 | 17.50 | 7.00 | 0.70 | 0.28 | 127.17 | 5.63 | 8,400 |
| 26 | 73.68 | 35.00 | 7.00 | 0.70 | 0.28 | 119.39 | 6.08 | 7,600 |

(1) Viscosity measured with a Brookfield RV viscometer using a #6 spindle @ 10 rpm.

The viscosity of the formulations having combinations of PAE resin and isocyanate was lower than the viscosity of the formulations containing only PAE resin.

Example 27

Plywood panels were prepared using the adhesive compositions of Examples 21 through 26. These 3-ply panels were fabricated using 12"×12" poplar veneers with average thickness of 3.6 mm (0.14"). The veneers were stored in an 80° F./30% relative humidity conditioning room prior to making the panels. Adhesive was applied to both sides of the center veneer at a level of 20 to 22 g per square foot. Veneer grain direction was alternated by 90° throughout the panel (orientation of the core veneer grain was perpendicular to the face and back veneer orientation). The 3-ply assemblies with wet glue were placed under an 14"×14" board with a 1 gallon water weight on top for 15 minutes (stand time) prior to being hot pressed. No cold pressing was used for these panels prior to hot pressing. After the stand time the panels were hot pressed for 3 minutes at 250° F. and 125 psi. The panels were held for 48 hours in a 70° F./50% relative humidity conditioning before being cut. After being cut the test samples were conditioned in a 70° F./50% relative humidity room for at least 24 hours prior to testing.

Three-cycle soak testing, dry and wet shear strength testing and dry bond evaluations were performed as described earlier. Test results for these panels are shown in Table 6.

TABLE 6

Properties of Panels Made with Examples 2, 13, 14 and 21 through 26

| | Panel Prep | | | 3-Cycle Soak | | Shear Strength Testing | | | |
|---|---|---|---|---|---|---|---|---|---|
| | Adhesive | | | | | Dry | | Wet | |
| | Example Number | PAE (phs) | pHDI (phs) | Avg. Score | % Pass | Shear (psi) | % Dry WF | Shear (psi) | % Wet WF |
| 15-B | 13-Comparative | 10 | 0 | 0.50 | 100% | 316 | 78 | 130 | 3 |
| 15-C | 14-Comparative | 15 | 0 | 3.50 | 25% | 285 | 63 | 139 | 2 |
| 15-D | 2-Comparative | 20 | 0 | 0.38 | 100% | 389 | 90 | 217 | 8 |
| 27-A | 21-Comparative | 0 | 10 | 10.00 | 0% | 182 | 0 | 0 | 0 |
| 27-B | 22-Comparative | 0 | 20 | 10.00 | 0% | 271 | 3 | 0 | 0 |
| 27-C | 23 | 5 | 5 | 4.00 | 25% | 471 | 100 | 104 | 0 |
| 27-D | 24 | 10 | 5 | 0.00 | 100% | 455 | 100 | 211 | 3 |
| 27-E | 25 | 5 | 10 | 4.38 | 50% | 312 | 66 | 93 | 0 |
| 27-F | 26 | 10 | 10 | 0.00 | 100% | 357 | 78 | 195 | 0 |

In panel examples 27-A and 27-B (made with comparative adhesive Examples 21 and 22) we see that the use of isocyanate as the only additive (no PAE) showed very poor 3-cycle soak and wet shear properties while the dry shear properties were lower than those seen with the PAE additive used alone (panel Examples 15-B, 15-C and 15-D) and with the combination of PAE and isocyanate (examples 27-C through 27-F). Examples 27C through 27-F tested a number of combinations of PAE with isocyanate. In Examples 27-C and 27-D the combination of PAE and isocyanate showed excellent dry shear strength and dry wood failure. Example 27-D also showed excellent 3-cycle soak and wet shear properties. These results demonstrate that the combination of PAE and isocyanate can provide better properties than an equivalent amount of PAE by itself (Example 27-D compared to Example 15-C). However, the ratio of PAE to isocyanate is also important in providing good adhesive properties. While Example 27-D gives excellent adhesive properties with a PAE to isocyanate ratio of 10:5, the adhesive properties of Example 27-E are much poorer when the ratio of PAE to isocyanate ratio is changed to 5:10.

Examples 28 through 32 provide comparisons of adhesive performance of PAE/soy adhesive formulations with isocyanate/PAE/soy adhesive formulations when used to bond fumed yellow birch, a difficult to bond wood type.

Examples 28 to 32

These examples were prepared by mixing varied quantities of water, PAE polymer, isocyanate, soy flour, sodium metabisulfite and defoamer. The exact quantities of the additives used in these examples are shown in Table 9. Example 36 was a comparative example which used only PAE additive. These formulations were prepared by adding DI water, Hercules® CA1920A PAE polymer (available from Hercules Incorporated, Wilmington Del.) and SMBS in a 600 mL stainless steel beaker and mixing well for about 1 minute. After adding Soyad® TS9200 soy flour (available from Hercules Incorporated, Wilmington Del.) to this stirred mixture the combination was stirred vigorously for 8 minutes. Dorus® R-400 pHDI isocyanate was then added to the formulations which required it and the resulting mixture was stirred for an additional two minutes. At this point the pH and viscosity of the preparations was measured. Viscosity was measured using a Brookfield RV viscometer using a #6 spindle at 10 rpm. These values can be found in Table 7.

TABLE 7

Examples 28 to 32

| Example Number | g TS9200 Soy Flour | g CA1920A PAE Polymer | g Dorus R-400 pHDI | g SMBS | g A-357 Defoamer | g DI Water | pH | Viscosity (cP) (1) |
|---|---|---|---|---|---|---|---|---|
| 28 | 73.68 | 87.50 | 0.00 | 0.70 | 0.28 | 83.61 | 5.13 | 20,100 |
| 29 | 73.68 | 35.00 | 3.50 | 0.70 | 0.28 | 113.20 | 5.62 | 14,800 |
| 30 | 73.68 | 52.50 | 3.50 | 0.70 | 0.28 | 105.40 | 5.47 | 12,900 |
| 31 | 73.68 | 70.00 | 1.75 | 0.70 | 0.28 | 94.50 | 5.31 | 13,300 |
| 32 | 73.68 | 70.00 | 3.50 | 0.70 | 0.28 | 97.61 | 5.30 | 11,900 |

(1) Viscosity measured with a Brookfield RV viscometer using a #6 spindle @ 10 rpm.

Example 33

Plywood panels were prepared using the adhesive compositions of Examples 28 through 32. These 3-ply panels were fabricated using 12"×12" veneers. The panel construction consisted of a fumed yellow birch (FYB) face veneer with a gum core and a poplar back veneer. The veneers were stored in an 80° F./30% relative humidity conditioning room prior to making the panels. Adhesive was applied to both sides of the center veneer at a level of 20 to 22 g per square foot. Veneer grain direction was alternated by 90° throughout the panel (orientation of the core veneer grain was perpendicular to the face and back veneer orientation). The 3-ply assemblies with wet glue were placed under an 14"×14" board with a 1 gallon water weight on top for 15 minutes (stand time) prior to being hot pressed. After the stand time the panels were cold pressed for 10 minutes at 100 psi. After being evaluated for tack using the 0 to 5 scale described previously, the panels were hot pressed for 3 minutes at 250° F. and 125 psi. The panels were held for 48 hours in a 70° F./50% relative humidity conditioning before being cut. After being cut the test samples were conditioned in a 70° F./50% relative humidity room for at least 24 hours prior to testing.

Three-cycle soak testing and dry bond evaluation of the FYB-gum bond (bond line 1) were performed as described earlier. Test results for these panels are shown in Table 8.

TABLE 8

Properties of Panels Made with Adhesive Examples 28 to 32

| | | Panel Prep | | Tack | Panel Testing | | |
|---|---|---|---|---|---|---|---|
| | Adhesive | | | BL1/ | 3-Cycle Soak | | DBE |
| Example Number | Example Number | PAE (phs) | pHDI (phs) | BL2 (1) | BL1 Score | % Pass | BL1 DBE |
| 33-A | 28-Comparative | 25 | 0 | 3/5 | 9.50 | 0% | 2.0 |
| 33-B | 29 | 5 | 5 | 4/5 | 2.33 | 100% | 2.5 |
| 33-C | 30 | 10 | 5 | 4/5 | 0.00 | 100% | 2.6 |
| 33-D | 31 | 20 | 2.5 | 5/5 | 2.67 | 100% | 4.0 |
| 33-E | 32 | 20 | 5 | 5/5 | 0.00 | 100% | 5.0 |

These results showed a dramatic difference between the comparative 33-A with only PAE additive and the examples that contained both PAE and isocyanate additives. The tack of Example 33-A was only a 3 for bond line 1 (FYB-gum) while the inventive examples all had tack values of 4 and 5 for this bond line. While comparative Example 33-A had a 0% pass rate for the 3-cycle soak test, the panels made with the inventive examples all passed at 100%. The 3-cycle soak score for bond line 1 was 9.5 for comparative Example 36 (the worst score on this scale is 10: completely delaminated and separated veneers) while the inventive examples all had scores of less than 3, with two of these formulations scoring 0 (no delamination at all). The dry bond evaluation of bond line 1 also showed a significant difference between the comparative example and the inventive examples. The comparative example had a DBE score of 2.0 for bond line 1. The inventive examples with various combinations of PAE polymer and isocyanates all had higher DBE scores. This is particularly surprising since most of the inventive formulations used a lower total amount of additive. Examples 33-D and 33-E had scores of 4.0 and 5.0 respectively and exhibited very high levels of wood failure in the DBE test. High DBE score are considered critical for the production of commercial grade flooring or decorative plywood.

Example 34

Addition of HDI and MDI and hold times: This example shows the benefits of adding two different isocyanates, hexamethylenediisocyanate (HDI) and methylene diphenyl diisocyanate (MDI), to a soy based adhesive formulation for preparation of particle board. The HDI used was a polyHDI called Dorus R400 from Henkel and the MDI used was a poly(MDI) called Runbinate 1840 from Huntsman.

The particle board furnish used was "core" furnish from a particle board mill. Core furnish is coarser than "face" furnish. Those skilled in the art are familiar with the differences.

The soy mixture used was prepared with a ratio of 1 part Prolia 200/90 soy flour from Cargill and 1.33 parts glycerol. The soy was mixed with water (enough to give a final product solids of 61%), 0.004 parts of Ashland's Advantage 357 defoamer, 0.0003 parts biocide (methylene bisthiocyanate) and 0.013 parts sodium metabisulfite.

The PAE resin used was a low molecular weight version with 55% solids. It was of the type described by U.S. patent application Ser. No. 13/020,069 filed Feb. 3, 2011.

100 parts (dry basis) of the soy mixture was combined thoroughly with 30 parts (dry basis) of PAE. In the HDI sample 5 parts HDI was added and mixed well and in the MDI samples 10 parts MDI was added and mixed well. The different formulations for treating the wood were prepared and used within 10 minutes. Good mixing was used.

Wood furnish was placed in an 800 Watt Bosch Universal Mixer that has stirring around the mixing bowl and also a continuous flipping of the wood. The mixer "cookie dough" paddles were used and its slowest mixing speed. While the wood furnish was being stirred it was sprayed with an aspirated stream of each adhesive formulation. Spray time was approximately one minute. To 100 parts wood (dry basis), 8 parts adhesive (dry basis) was added. The moisture of the wood was about 3.7%, which is typical for wood used at particle board mills. Water was added into the adhesive formulations so all boards had the same final moisture content of 10.5 parts moisture to 100 parts dry wood. After spraying the wood was mixed for 30 more seconds.

The treated wood was immediately placed in a rectangular former with inner dimensions of 10" by 10". 525 g of wood (dry untreated basis) was added, which was sufficient for a final board thickness of ½" at a density of about 55 pounds per cubic foot. The wood in the former was leveled and cold pressed at 100 psi to give a formed mat with some integrity. The form was removed. The mat was formed on a platen which was then transferred to a hot press. A top platen was placed on it and the structure was pressed at 160° C. press temperature for 4 minutes from the time the press reached ½" shims beside the formed structure. The press was closed as quickly as possible and consistently for each sample. After pressing the composites were removed from the press, the platens were removed, and each board allowed to cool for 15 minutes under identical conditions before being bagged.

The boards were cut the next day into 8" by 1" pieces, each being treated in the same manner. 8 test pieces were cut from each sample. The board dimensions were determined and the Modulus of Rupture for each sample was measure by a 3 point bend test. For each sample the strengths of the 8 pieces were averaged and the 90% confidence statistics determined. The strength results are reported at the top of Table 9. Also listed are the viscosities and pHs of the final adhesive formulations. The differences were not significant.

The addition of the HDI and the MDI greatly increased the strength of the boards versus the control with no HDI or MDI.

TABLE 9

Example 34

| | Description | MOR | Adh. pH | Adh. Visc. |
|---|---|---|---|---|
| 34A | control, no HDI or MDI | 2118 | 5.47 | 210 |
| 34B | +5HDI, no hold | 2323 | 5.49 | 300 |
| 34C | +10MDI, no hold | 2602 | 5.44 | 250 |
| 34D | +5HDI, 60 min hold | 2368 | 5.42 | 220 |
| 34E | +5HDI, 120 min hold | 2343 | 5.39 | 200 |
| 34F | +10MDI, 60 min hold | 2511 | 5.39 | 230 |

In the same set of experiments the adhesive formulations were held after mixing and before spraying to determine if the HDI or MDI had any detrimental effects on the adhesive pot-life. The HDI formulation was held 60 minutes and 120 minutes prior to use. The MDI formulation was held 60 minutes. Within the experimental scatter, holding the HDI formulation did not effect its performance. Holding the MDI formulation may have led to a slight decrease of performance, but there was still a large benefit over the control.

Example 35

Variations of HDI: This example shows the benefits of adding four different types of poly hexamethylenediisocyantes, (HDI) to a soy based adhesive formulation for preparation of particle board. The HDI's used were Bayhydur 302, Bayhydur 303 and Bayhydur 2547 from Bayer and Easaqua MX 501 from Perstorp.

The particle board furnish used was "core" furnish from a particle board mill. Core furnish is courser than "face" furnish. Those skilled in the art are familiar with the differences.

The soy mixture used was prepared with a ratio of 1 part Prolia 200/90 soy flour from Cargill and 0.5 parts glycerol and 0.5 parts urea. The soy was mixed with water (enough to give a final product solids of 50%, 0.004 parts of Ashland's Advantage 357 defoamer, and 0.013 parts sodium metabisulfite and acidified to pH 4.0 using sulfuric acid.

The PAE resin used was a low molecular weight version with 55% solids. It was of the type described by U.S. patent application Ser. No. 13/020,069 filed Feb. 3, 2011.

100 parts (dry basis) of the soy mixture was combined thoroughly with 30 parts (dry basis) of PAE. At that point 5 parts HDI was added and mixed well. The different formulations for treating the wood were prepared and used within 10 minutes. The wood furnish was then treated and boards formed as outlined in Example 1.

The boards were cut the next day into 8" by 1" pieces, each being treated in the same manner. 8 test pieces were cut from each sample. The board dimensions were determined and the Modulus of Rupture for each sample was measure by a 3 point bend test. For each sample the strengths of the 8 pieces were averaged and the 95% confidence statistics determined. The strength results are reported at the top of Table 10.

The addition of the HDI greatly increased the strength of the boards versus the control with no HDI. This is especially true for the Bayhydur 302, Bayhydur 2547 and the Easaqua XM 501.

TABLE 10

Example 35

| | MOR Normalized (psi) | NCO Wt % | NCO viscosity (cps) |
|---|---|---|---|
| Control (No HDI) | 1541 | - | - |
| Bayhydur 303 | 1660 | 19.3 | 2400 |
| Bayhydur 302 | 1727 | 17.3 | 2300 |
| Bayhydur XP 2547 | 1782 | 23 | 600 |
| EASAQUA XM 501 | 1781 | 21 | 1100 |

Example 36

MOR Response for the addition of HDI: This example demonstrates the performance enhancement observed from adding three different levels of hexamethylenediisocyanate (HDI) to a soy based adhesive formulation for the preparation of particle board. The HDI used was a poly-HDI called Bayhydur 302 from Bayer.

The particle board furnish used was "core" furnish from a particle board mill. The largest pieces were removed by 2 mm pore size sieve in order to achieve a uniform material. Core furnish is coarser than "face" furnish. Those skilled in the art are familiar with the differences.

The soy and PAE portions of the adhesive were the same as used in Example 44.

100 parts (dry basis) of the soy mixture was combined thoroughly with 20 parts (dry basis) of PAE. In the HDI containing samples, 2.5, 5.0, and 7.5 parts of HDI was added respectively. The resulting adhesive samples were mixed well, and the different formulations for treating the wood were used within 10 minutes. Good mixing was used.

Wood furnish was treated and boards were made as in example 43. To 100 parts wood (dry basis), 6.5 parts adhesive (dry basis) was added. The moisture of the wood was about 2.0%, which is typical for wood used at particle board mills. Water was added into the adhesive formulations so all boards had the same final moisture content of 8.05 parts moisture to 100 parts dry wood. After hot pressing the composites were removed from the press, the platens were removed, and each board allowed to cool under identical conditions before being equilibrated at a constant 21° C. and 50% relative humidity for one week.

The boards were cut into 8" by 1" pieces, each being treated in the same manner. 8 test pieces were cut from each sample. The board dimensions were determined and the Modulus of Rupture for each sample was measure by a 3 point bend test. For each sample the strengths of the 8 pieces were averaged and the 90% confidence statistics determined. The strength results are reported at the top of Table 11.

The addition of the HDI greatly increased the strength of the boards versus the control with no HDI.

TABLE 11

Example 36

| Description | MOR |
|---|---|
| Control, no HDI (6.5 pph Adhesive) | 1514 |
| +2.5 HDI (6.5 pph Adhesive) | 1641 |
| +5.0 HDI (6.5 pph Adhesive) | 1722 |
| +7.5 HDI (6.5 pph Adhesive) | 1799 |
| +Control, no HDI (8.5 pph Adhesive) | 1885 |
| +2.5 HDI (8.5 pph Adhesive) | 2101 |
| +7.5 HDI (8.5 pph Adhesive) | 2147 |

Also included in this experiment was a set of conditions comparing adhesive formulations containing 100 parts (dry basis) of the soy mixture, 30 parts (dry basis) of PAE, 0, 2.5, and 7.5 parts respectively of HDI. In these samples, the treated furnish contained 8.5 parts per 100 g parts dry wood. 478 g of wood (dry untreated basis) was added, which was sufficient for a final board thickness of ½" at a density of about 45 pounds per cubic foot All values reported in Table 11 were derived from the average of duplicate boards except for the "+7.5 HDI (6.5 pph Adhesive)" example, which contains data from a single board.

The higher level of adhesive, as with the lower level of adhesive, showed that the MOR improved as the level of HDI added was increased.

Example 37

Partial replacement of PAE with HDI: The previous examples showed the benefit of the addition of a poly(HDI) to a soy based adhesive formulation. This example demonstrates that HDI may be substituted in place of the PAE in a soy based adhesive and still provide improved strength. The example is for preparation of particle board. The HDI used was Bayhydur 302. The soy and PAE materials were the same as those used in example 35.

Face particle board furnish was used and 10 inch particle board samples were prepared as in example #34 with some differences. 8.0 parts adhesive (dry basis) was combined with 100 parts (dry basis) of wood. The adhesive solids for each sample was adjusted by the addition of water such that the final moisture content of the treated wood was 10.5 parts to 100 parts dry wood. 461 g of wood (dry untreated basis) was added, which was sufficient for a final board thickness of ½" at a density of about 44.5 pounds per cubic foot. The hot pressing of the board was for 3 minutes at 170° C. The final boards were prepared and tested as in example #43.

For the control sample, 100 parts (dry basis) of the soy mixture was combined thoroughly with 20 parts (dry basis) of PAE. In the HDI containing samples, 2.5, 5.0, 7.5, or 10 parts of PAE was substituted with HDI. The resulting adhesive samples were mixed well, and the different formulations for treating the wood were used within 10 minutes.

TABLE 12

Example 37

| Description | MOR | Internal Bond |
|---|---|---|
| Control, no HDI | 1770 | 101 |
| Replaced 2.5 parts PAE with HDI | 1841 | 118 |
| Replaced 5.0 parts PAE with HDI | 1872 | 129 |
| Replaced 7.5 parts PAE with HDI | 2052 | 129 |
| Replaced 10 parts PAE with HDI | 2106 | 142 |

By substituting HDI in place of PAE, the MOR increased significantly. MOR values were obtained from the average of 16 specimens from two boards for each sample. The MOR trend was the same regardless of the use of the unadjusted MOR or an MOR value interpolated to a board density of 44.44 pounds per cubic foot.

Internal bond strength was also measured on the samples. An average of 12 specimens from two boards for each sample were tested. Internal bond strength (IB) was measured on 1" by 1" samples by gluing the samples on the faces between two aluminum blocks. The samples were then pulled in the z-direction (faces away from each other) and the stress at failure was recorded. Although there was more scatter in the IB data, versus the MOR data, the trend was the same. Adding HDI improved the strength.

Example 38

Pre-spraying of HDI: This example demonstrates that pre-spraying and isocyanate onto the wood prior to the wood be treated by a soy-based adhesive still led to an improvement of strength. The example is for preparation of particle board. The HDI use was Dorus R400 which was described earlier.

Core particle board furnish was used and 10 inch particle board samples were prepared as in example 34 with some differences. The final moisture content of the treated wood was 8.7 parts to 100 parts dry wood. The hot pressing of the board was for 3 minutes at 170° C. The soy portion of the adhesive was made with ratios of 2 parts Prolia 200/90 soy flour from Cargill and 1 part glycerol and 1 part urea. The soy was mixed with water (enough to give a final product solids of 55%), 0.008 parts of Ashland's Advantage 357 defoamer, 0.0006 parts biocide (methylene bisthiocyanate) and 0.02 parts sodium metabisulfite. The pH of the mixture was lowered, with good mixing, to 3.8 with concentrated sulfuric acid solution. The urea was then stirred in.

The wood furnish was placed in the Bosch Universal Mixer as in example #34. While the wood furnish being stirred it was sprayed with an aspirated stream of HDI. Then the remainder of the adhesive was sprayed on. This was compared to a sample of adhesive with no HDI, and with an adhesive where the HDI was mixed into it before spraying, as in example #34. The MOR strengths are listed in Table 13. In addition to the MOR strength being determined the MOR values were plotted versus the density of each sample (one finds a correlation between density and strength). The plot data was fit to a linear line for each sample and from the line a interpolated strength value at 44 pounds per cubic foot was determined for each sample. In addition the MOR samples were later cut into 1" by 1" squares. These were glued on each face to metal test fixtures which allowed the samples to be pulled apart with a Z direction pull thus giving a measure of internal bond (IB) strength. This is a well known test in the industry. The IB peak strengths are in terms of psi. The results are shown in Table 13. The whole experiment was repeated a second time and the results are also listed.

TABLE 13

Example 38

| Description | Raw MOR | MOR@ 44 | Ave. IB | Adh. pH | Adh. Visc. |
|---|---|---|---|---|---|
| 1) control, no HDI | 1897 | 1711 | 114 | 4.19 | 3079 |
| 2) 5 parts Dorus R-400 mixed into adhesive | 2087 | 2014 | 131 | 4.28 | 2999 |
| 3) 5 parts Dorus R-400, sprayed first, D40999/ D41080 sprayed after | 2053 | 1919 | 145 | | |
| repeat of 1 | 2036 | 1892 | 101 | 4.3 | 2879 |
| repeat of 2 | 2226 | 2063 | 139 | 4.3 | 3339 |
| repeat of 3 | 2396 | 2157 | 140 | | |

By adding HDI to the soy/PAE adhesive the MOR and IB increased significantly. The raw MOR values were obtained from the average of 8 specimens for each sample. The IB results were the average of 6 specimens for each sample. The results were the same in a repeat of the experiment. The MOR trend was the same regardless of the use of the unadjusted MOR or an MOR value interpolated to a board density of 44 pounds per cubic foot.

Pre-spraying the HDI onto the wood prior to spraying on the adhesive led to an improvement of MOR and IB over the sample with no HDI. The improvement was about equal to the improvement obtained when the HDI was mixed into the adhesive.

The invention claimed is:

1. An adhesive composition comprising a soy, an amine-epichlorohydrin (AE) adduct and an isocyanate, wherein the AE adduct comprises a polyamidoamine epichlorohydrin (PAE) polymer; the isocyanate comprises poly(hexamethylene diisocyanate) [pHDI] or poly(methylene diphenyl diisocyanate); the ratio of the dry weight of AE adduct to dry weight of isocyanate material is from 10:1 to 1:1; and the ratio of soy to the total of the AE adduct component and isocyanate component in the composition is from 1:2 to 10:1.

2. The composition of claim 1 wherein the isocyanate is water-dispersible.

3. The composition of claim 1 wherein the AE adduct comprises a polyamidoamine-epichlorohydrin (PAE) polymer; the isocyanate comprises a water-dispersible isocyanate made from poly(hexamethylene diisocyanate) [pHDI] or poly(methylene diphenyl diisocyanate); and the ratio of the dry weight of AE adduct to dry weight of isocyanate material is from 10:1 to 1:1.

4. The composition of claim 1 wherein the AE adduct comprises a polyamidoamine-epichlorohydrin [PAE] polymer; the isocyanate comprises a water-dispersible isocyanate made from poly(hexamethylene diisocyanate) [pHDI]; the protein source comprises soy flour, and the ratio of the dry weight of AE adduct to dry weight of isocyanate is from 10:1 to 1:1.

5. A lignocellulosic composite comprising the composition of claim 1 and a lignocellulosic substrate.

6. The composite of claim 5 wherein the protein comprises soy, the AE adduct comprises a polyamidoamine-epichlorohydrin (PAE) polymer and the isocyanate comprises a water-dispersible isocyanate.

7. A method of making a composite comprising the steps of
a) providing a lignocellulosic substrate,
b) applying the adhesive composition of claim 1 to the substrate, and
c) subjecting the substrate/adhesive combination to heat and pressure to form the composite.

8. The method of claim 7 wherein the protein comprises soy, the AE adduct comprises a polyamidoamine-epichlorohydrin (PAE) polymer and the isocyanate comprises a water-dispersible isocyanate.

9. A method of making a composite comprising
a) providing a lignocellulosic substrate,
b) applying an isocyanate to the substrate
c) applying an AE adduct and soy mixture to the substrate, wherein the ratio of the dry weight of AE adduct to dry weight of isocyanate material is from 10:1 to 1:1; and the ratio of soy to the total of the AE adduct component and isocyanate component in the composition is from 1:2 to 10:1; and
d) subjecting the substrate/adhesive combination to heat and pressure to form the composite.

10. The method of claim 9 wherein the protein comprises soy, the AE adduct comprises a polyamidoamine-epichlorohydrin (PAE) polymer and the isocyanate comprises a water-dispersible isocyanate.

* * * * *